United States Patent

Husick

[11] Patent Number: 5,830,366
[45] Date of Patent: Nov. 3, 1998

[54] METHOD AND APPARATUS FOR FILTERING WATER ON VESSEL AND MACERATING RETAINED SOLIDS

[76] Inventor: Charles B. Husick, 1375 Pinellas Bayway #29, St. Petersburg, Fla. 33715

[21] Appl. No.: 696,378

[22] Filed: Aug. 13, 1996

Related U.S. Application Data

[60] Provisional application No. 60/008,093, Oct. 30, 1995.

[51] Int. Cl.[6] .......................... B01D 17/12; B01D 35/01; B01D 35/16
[52] U.S. Cl. ........................ 210/739; 114/270; 210/97; 210/143; 210/170; 210/173; 210/295; 210/407; 210/747; 210/767
[58] Field of Search .................. 210/87, 90, 94, 210/96.1, 96.2, 97, 106, 120, 121, 123, 127, 136, 138, 143, 170, 173, 241, 242.1, 257.1, 257.2, 258, 259, 321.6, 416.1, 416.3, 652, 747, 767, 413, 414, 415, 174, 295, 299, 407

[56] References Cited

U.S. PATENT DOCUMENTS

| | | | |
|---|---|---|---|
| 181,336 | 8/1876 | Hartzell | 210/242.1 |
| 763,325 | 6/1904 | Roche | 210/242.1 |
| 763,326 | 6/1904 | Roche | 210/242.1 |
| 763,327 | 6/1904 | Roche | 210/242.1 |
| 3,849,305 | 11/1974 | Manjikian | 210/120 |
| 3,852,191 | 12/1974 | Zucker | 210/173 |
| 3,937,662 | 2/1976 | Bartik | 210/745 |
| 4,169,789 | 10/1979 | Lerat | 210/652 |
| 4,359,789 | 11/1982 | Roberts | 210/805 |
| 4,919,800 | 4/1990 | Vinoski | 210/94 |
| 5,374,356 | 12/1994 | Miller et al. | 210/259 |

FOREIGN PATENT DOCUMENTS

| | | | |
|---|---|---|---|
| 2338901 | 8/1977 | France | 210/257.2 |
| 52-38765 | 3/1977 | Japan | 210/242.1 |
| 59-199093 | 11/1984 | Japan | 210/652 |

Primary Examiner—Joseph W. Drodge

[57] ABSTRACT

The present invention is related to a method and apparatus for filtering or straining water taken into a marine vessel so as to remove solid contaminants that may impede operation of water consuming devices on the vessel such as electrical generators, air conditioners, refrigeration systems, propulsion engines and the like. Solid contaminants retained by a filter or strainer are collected and then macerated and removed by a macerator pump. The solid contaminants removed and macerated include marine weeds, grasses, solid matter and marine organisms, including, but not limited to jellyfish and fish of such size as may be able to enter the sea water intake served by the invention. The water so treated may be fresh, brackish or salt water.

19 Claims, 1 Drawing Sheet

METHOD AND APPARATUS FOR FILTERING WATER ON VESSEL AND MACERATING RETAINED SOLIDS

This application is a continuation of U.S. Provisional Application No. 60/008,093, filed Oct. 30, 1995.

BACKGROUND OF THE INVENTION

The present invention is related to a method and apparatus for filtering water so as to remove particulate matter, including marine weeds, grasses, solid matter and marine organisms, including, but not limited to jellyfish and fish of such size as may be able to enter the sea water intake served by the invention. The water so treated may be fresh, brackish or salt water.

DESCRIPTION OF THE PRIOR ART

It is common practice to provide vessels with a means by which water may be taken into the interior of the vessel for use therein. Propulsion engines, engines which drive electrical generators or other powered systems, refrigeration systems and air conditioning systems all require substantial flows of water for cooling. Bait wells and live wells require constant flows of fresh oxygenated water to maintain fish in a healthy and active state. Devices which produce potable water, including evaporators and reverse osmosis systems require feed water from which to produce potable water, and to carry away waste streams. Deck wash-down pumps require a supply of filtered sea water. Many of these same water requirements exist in fixed and mobile land based systems which are permitted to draw water from contaminated sources.

The conventional method for primary filtration of intake water consists of the use of a "raw water strainer" which incorporates a porous filter element, often comprised of a perforated metal basket which traps the material to be excluded, allowing the water to flow through the holes in the filter element and then onward to its point of use. This type of filter device suffers from a significant failing in that the material which is excluded from the onward flow of filtered water is retained within the strainer, eventually leading to obstruction of the filter element and therefore a reduction ion the volume of or interruption of the flow of water. This type of filter requires that the water flow be interrupted and the filter opened to remove the retained material.

SUMMARY OF THE INVENTION

The present invention greatly reduces the susceptibility of raw water strainers to clogging by retained material filtered from the water flow, thereby making the removal of the filter from service for cleaning unnecessary or a much less frequent requirement.

The filter apparatus of the present invention operates using continuous, periodic or commanded discharge of trapped contaminants through a waste discharge outlet by the use of maceration apparatus and significant pressure differentials within the filter assembly. In the preferred embodiment of the invention, a metallic or plastic water filter element separates undesirable material from the sea water flow. The filter chamber in which the separated material is held is equipped with a mechanically-driven rotating element macerator / pump (that may be driven electrically, hydraulically, or by any conventional prime mover such as an internal combustion engine.) Periodically, the macerator is operated, thereby grinding the contaminant materials collected within the body of the filter and as a consequence of the pumping action, discharging them through a discharge through-hull fitting. Alternatively, a conventional marine sea water strainer (filter), may be modified by the addition of a water flow path which will permit debris accumulated by the filter element to be directed to a suitable waste pump which will discharge overboard or to a waste receptacle or the like. This waste water flow will carry with it the contaminants which have been separated from the input flow by the mechanical action of the filter element. The ratio of the flow of filtered product water to contaminated discharge water is adjusted to permit sufficient flow of water to waste to prevent a build-up of flow-reducing contaminants within the filter element. The movement of contaminants into the waste flow is also assured by designing a filter assembly wherein the ratio of the area of the filter through which the filtered water passes to the area through which the waste discharge occurs is large, typically on the order of 10:1, thereby enhancing the movement of contaminants toward the discharge port as a result of the higher velocity of the discharge flow.

Under circumstances where it may be desirable to operate the waste discharge system only intermittently, the waste discharge system is enabled by an interval timer or by a flow monitor system. This flow monitor operates by sensing an increase in pressure drop across the filter element, (differential pressure from inlet to filtered water output), or by monitoring the degree of obstruction of the filter element by optical means, (transmitted light attenuation, in either the visible or infrared portion of the spectrum), or by directly sensing fluid flow. When the waste discharge system is not commanded to operate by the flow monitor, the filter operates conventionally, with all of the input flow appearing at the output and little or no discharge to waste. When the flow monitor detects sufficient blockage of the filter element, the waste pump is operated, inducing an energetic flow of water from the input side of the filter element to the waste discharge, carrying with it the trapped contaminants present on the input side of the filter. Optionally, the flow of water to the output side of the filter may simultaneously be reduced, eliminated, or reversed for a short period by appropriate means, to aid in cleansing of the filter element The waste pump used to induce the flow of water to the waste discharge system may be a centrifugal type which will allow the passage of contaminants, a diaphragm or macerator type chosen for its ability to pass contaminants, a jet pump (aspirator) energized by a water flow tapped from the main system pump, or some combination of these, such as a centrifugal pump having a pre-maceration stage. It is contemplated that a jet type pump would operate continuously, while a centrifugal pump would operate continuously whenever contaminants were known to be or suspected to be present in the intake water flow. A diaphragm or macerator type pump would likely operate only when activated by a filter flow monitor system or interval timer system.

The filter system of the present invention may also find use in terrestrial applications such as in pumps used to fight flood conditions, fire fighting apparatus, or sump pumps of the type used to drain construction sites and the like.

DETAILED DESCRIPTION OF THE INVENTION

Figure 1:
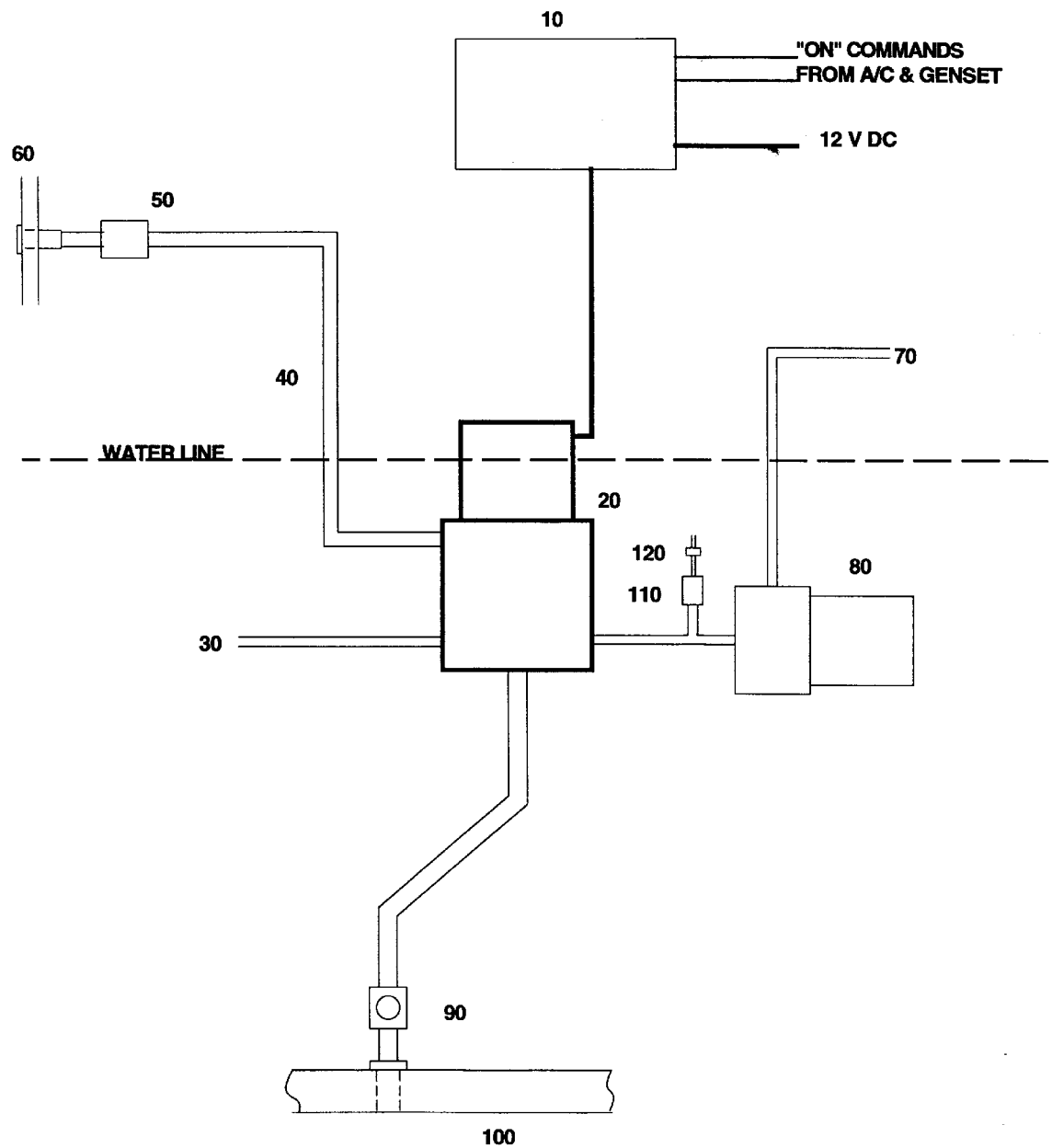
FIG. 1 depicts a section view of a raw water filter according to the present invention to provide for the incorporation of a rotating macerator / pump element within the portion of the filter chamber which retains material removed from the filtered water flow. Raw water enters the system at the pipe marked inlet and passes through the porous cylindrical filter element into the filtered water annulus from which filtered water may be withdrawn through one or more filtered water outlets. Trapped debris remains within the center of the filter element. When desired, the rotating macerator / pump element at the base of the filter operates, drawing the trapped debris into the macerating passages at the perimeter of the rotating disc and subsequently expelling the macerated debris and water from the device through the waste discharge port. This port is connected to a waste discharge line which normally penetrates the vessel's hull immediately above the water line. The clog resistant filter is designed to provide a simultaneous flow of filtered water to more than one consumer, thereby allowing the device to function as a sea chest. This capability can be used to reduce the number of below the water line hull penetrations, sea cocks and raw water strainers needed to serve various consumers. In addition to the water filtering capability of the invention a means is incorporated for the elimination of air locks at the water feed to connected consumers. Since some of these consumers are of a type which will not self bleed and may be damaged by operation without the presence of water, a means for elimination of any air lock conditions is highly desirable.

Referring now to FIG. 1 there is shown a modified marine sea water system. Vessel hull bottom 100 is equipped with a through-hull fitting and sea cock 90 having sufficient diameter to permit substantially unimpeded flow of required sea water to filter-pump assembly 20. Filter pump assembly 20 contains filter or strainer 24 and macerator pump 23 and is provided with debris discharge line 40, and with connections to consumers of sea water within the vessel, such as generator cooling water line 30 and air conditioning pump 80, which provides water to heat exchangers in the air conditioning system via line 70. Debris discharge line 40 is connected, in turn, through check valve 50 to discharge port 60 which is installed through the hull above the water line.

Operation of filter pump assembly 20 is provided with a control module 10, which is commanded by signals from the vessel air conditioning and electrical generation systems, as well as by signals from contamination sensors (not shown) and by an internal timer function of control module 10. Such timer function commands operation of filter pump assembly 20 during a predetermined interval (for instance, a sixty-second operational cycle) periodically during a predetermined time epoch (for instance, one operational cycle during each hour.) Under combined command from various sources, the control may be commanded to operate, for instance, for one operational cycle for each hour of time during which the vessel air conditioning and/or electrical generation systems are run, or may be operated strictly on "clock" time (running one operational cycle during each hour of the day.)

Input water enters the hull via sea cock 90, and flows to the filter pump assembly 20, and thence to consumers of sea water via lines 30 and 70. On demand, command, or at a predetermined interval, waste materials and water are discharged via line 40 through check valve 50 and overboard through port 60.

When the clog resistant strainer system of the present invention is used to replace an existing sea water strainer it is advisable to increase the size of the water intake apparatus, the through-hull fitting, the sea cock and the piping by approximately 50% in cross section area and to fit a clog resistant strainer of appropriately larger size than the original. This action is necessary to allow for the necessary increase in the total volume of water which will flow through the system as a consequence of the action of the scavenge pump.

The air lock elimination sub system 110 and 120 is comprised of a float equipped bleed valve 110 which in the absence of water in its interior opens a vent which communicates to check valve 120. When an air lock condition exists, the level of the filter assembly 20 below the water line of the vessel, combined with the open state of valve 110, allows trapped air to be vented into the line communicating with check valve 120. As soon as the water level reaches the upper portion of bleed valve 110, this valve closes, reestablishing the water tight integrity of the system. In the event the sea water inlet in the hull becomes obstructed, preventing the free entry of water, pump 80 will attempt to draw from both the filter 20 and from bleed valve 110. In this instance, check valve 120, which operates to allow the passage of air only outward from bleed valve, will close, preventing the entry of air into the inlet of pump 80 and the associated piping.

STATEMENT OF UTILITY

The present invention is useful in vessels which consume sea water for cooling and other functions, and which operate in areas of high solid contaminant concentrations (such as grasses, jelly fish, and the like) which require periodic clean-out of raw water strainers.

I claim as my invention:

1. A vessel adapted to be located in a body of water and including a system for filtration of water taken into the vessel and adapted to remove and discard solid contaminants from said water, said system comprising:
   a) a water inlet in fluid communication with the body of water in which said vessel is located,
   b) one or more water consumer devices on said vessel,
   c) one or more consumer water outlets, said consumer water outlets in fluid communication with said one or more water consumer devices,
   d) a water flow path connecting said water inlet to said consumer water outlets,
   e) a mechanical strainer or filter interposed in said water flow path, through which substantially all of said water is forced to travel in flowing from said water inlet to said consumer water outlets, and adapted to retain said solid contaminants contained in said water,
   f) a mechanical pump operable to macerate for discharging said retained solid contaminants from said strainer or filter,
   g) a waste outlet in fluid communication with said pump, adapted to discharge said retained solid contaminants,
   h) a motive means for driving said pump.

2. The system of claim 1 wherein at least one of said one or more water consumer devices is an electric power generation system.

3. The system of claim 1 wherein at least one of said one or more water consumer devices is a refrigeration system.

4. The system of claim 1 wherein at least one of said one or more water consumer devices is an air conditioning system.

5. The system of claim 1 wherein said water inlet is in fluid communication with a through-hull sea-cock fitting located below the water line of said vessel.

6. The system of claim 1 wherein said water flow path is located below the water line of said vessel.

7. The system of claim 1 wherein at least one of said one or more water consumer devices is located below the water line of said vessel, and said consumer water outlet in fluid communication with said water consumer device further comprises an air lock elimination system comprised of a float-equipped bleed valve in fluid communication with a check valve, said air lock elimination system adapted to permit air trapped in said flow path to be vented to the atmosphere under pressure created by gravitational flow of water into said flow path, and further adapted to prevent entry of air into said flow path when said water inlet is obstructed.

8. The system of claim 1 wherein said motive means is an electric motor.

9. The system of claim 8 wherein said electric motor is further provided with switch means to permit operation responsive to actuation of a control means by a human operator.

10. The system of claim 8 wherein said electric motor is further provided with switch means adapted to permit operation responsive to an interval timer means for providing an actuation signal of predetermined duration over a predetermined epoch.

11. The system of claim 8 wherein said electric motor is further provided with switch means adapted to permit operation responsive to operation of one of said one or more water consumer devices.

12. The system of claim 8 wherein said electric motor is further provided with switch means adapted to permit operation responsive to a sensed condition indicative of the presence of solid contaminants in said water flow path.

13. The system of claim 12 wherein said sensed condition is a decrease in total water flow through said consumer water outlets as compared to the demand imposed by said one or more water consumer devices.

14. The system of claim 12 wherein said sensed condition is an increase in pressure within said water flow path upstream of said strainer or filter.

15. The system of claim 12 wherein said sensed condition is obstruction of an optical path within said water flow path.

16. The system of claim 1 wherein at least one of said one or more water consumer devices is a propulsion engine.

17. A method for providing water that is substantially free of solid contaminants to water consuming devices on a vessel having a hull comprising the steps of:
   a) permitting water to flow from outside the hull of said vessel to a water inlet of a strainer means,
   b) directing said water through a water flow path in said strainer means, in which is interposed a mechanical strainer or filter for retaining solid contaminants entrained in said water,
   c) directing said strained or filtered water to one or more water consumer devices located on said vessel, and
   d) periodically operating a mechanical macerator pump to discharge said retained solid contaminants overboard through a discharge port.

18. The method of claim 17 further comprising the step of:
   a) operating said mechanical pump is response to a signal indicative of the operation of one or more of said one or more water consuming devices.

19. The method of claim 17 further comprising the step of:
   a) operating said mechanical pump is response to a signal indicative of the presence of solid contaminants in said water flow path.

* * * * *